United States Patent [19]
Hayashi et al.

[11] Patent Number: 5,689,661
[45] Date of Patent: Nov. 18, 1997

[54] RECONFIGURABLE TORUS NETWORK HAVING SWITCHES BETWEEN ALL ADJACENT PROCESSOR ELEMENTS FOR STATICALLY OR DYNAMICALLY SPLITTING THE NETWORK INTO A PLURALITY OF SUBSYSTEMS

[75] Inventors: Kenichi Hayashi, Kawasaki, Japan; Isaac Liu Chuang, Prospect, Ky.

[73] Assignee: Fujitsu Limited, Kawasaki, Japan

[21] Appl. No.: 683,140

[22] Filed: Jul. 18, 1996

Related U.S. Application Data

[63] Continuation of Ser. No. 210,457, Mar. 21, 1994, abandoned.

[30] Foreign Application Priority Data

Mar. 31, 1993 [JP] Japan .................. 5-074409

[51] Int. Cl.$^6$ ............................................ G06F 15/16
[52] U.S. Cl. ................ 395/311; 395/800; 364/229.4; 364/229.3; 364/240; 364/DIG. 1
[58] Field of Search ...................... 395/800, 311, 395/312; 370/85.9

[56] References Cited

U.S. PATENT DOCUMENTS

| | | | |
|---|---|---|---|
| 4,466,064 | 8/1984 | Martin | 395/800 |
| 4,635,192 | 1/1987 | Ceccon et al. | 395/325 |
| 4,696,001 | 9/1987 | Gagliardi et al. | 370/88 |
| 4,745,597 | 5/1988 | Morgan et al. | 370/85.9 |
| 4,790,026 | 12/1988 | Gennery et al. | 382/49 |
| 4,805,091 | 2/1989 | Thiel et al. | 395/800 |
| 4,905,143 | 2/1990 | Takahashi et al. | 395/800 |
| 4,922,418 | 5/1990 | Dolecek | 395/185.04 |
| 5,020,059 | 5/1991 | Gorin et al. | 371/11.3 |
| 5,046,185 | 9/1991 | Hirai et al. | 375/4 |
| 5,144,622 | 9/1992 | Takayasu | 370/85.13 |
| 5,163,120 | 11/1992 | Childers et al. | 395/800 |
| 5,168,572 | 12/1992 | Perkins | 395/800 |
| 5,185,866 | 2/1993 | Francisco | 395/325 |
| 5,191,579 | 3/1993 | Matsushita et al. | 370/85.15 |
| 5,408,616 | 4/1995 | Murr | 395/325 |
| 5,414,819 | 5/1995 | Redmond et al. | 395/311 |
| 5,420,982 | 5/1995 | Take | 395/800 |

FOREIGN PATENT DOCUMENTS

| | | |
|---|---|---|
| 544 532 | 6/1993 | European Pat. Off. . |
| 588 104 | 3/1994 | European Pat. Off. . |

*Primary Examiner*—Meng-Ai T. An
*Attorney, Agent, or Firm*—Staas & Halsey

[57] ABSTRACT

An n-dimensional torus network-based parallel computer, n being an integer greater than 1, is folded n times with the results of folding embedded in an n-dimensional layer for connection with an interleave connecting unit. Four-terminal switches or switch units are placed at the folding positions. The switching units are changed so that any two of the four terminals are linked together. This permits the torus network to be split into subtorus networks or subtori. The subtori can be integrated into the original torus network whereby the reconfiguration of the torus network is realized. The switches are changed over by the switching unit in either a static mode or a dynamic mode. In the static mode, only the system side is allowed to change over the switches. In the dynamic mode, users are allowed to transmit a message to cause the switching unit to change over the switches. By connecting a communications path between the switches, the communication distance between distant processor elements can be reduced, permitting high-speed communication. This permits high-speed global calculations and broadcast processing.

26 Claims, 11 Drawing Sheets

ONE-DIMENSIONAL TORUS NETWORK

0 ~ 7 : PROCESSORS

FIG. 1A
(PRIOR ART)

SPLITTING METHOD

0 ~ 7 : PROCESSORS

: SWITCH (ON STATE)

: SWITCH (OFF STATE)

16-PROCESSOR ONE-DIMENSIONAL TORUS NETWORK

FIG. 4B

SWITCH STATES — THROUGH SWITCH, TURN SWITCH (TURN)

[0]~[63] : PROCESSORS (NUMBERS REPRESENT LOGICAL ID)

: THROUGH SWITCH

: TURN SWITCH

Step 1

Step 2

Step 3

RECONFIGURABLE TORUS NETWORK HAVING SWITCHES BETWEEN ALL ADJACENT PROCESSOR ELEMENTS FOR STATICALLY OR DYNAMICALLY SPLITTING THE NETWORK INTO A PLURALITY OF SUBSYSTEMS

This application is a continuation of application Ser. No. 08/210,457, filed Mar. 21, 1994, now abandoned.

BACKGROUND OF THE INVENTION

1. Field of the Invention

The present invention relates to a reconfigurable torus network system used in a parallel computer and, more particularly, to a reconfigurable torus network system which is capable of being split into a plurality of subsystems having subtori of the same phase for availability to a plurality of users, and high-speed global calculations and broadcast processing.

2. Description of the Related Art

Coupling techniques for parallel computers include mesh, binary n-cube, hyper-cube and torus networks. When the cost of hardware is assumed to be constant, k-ary n-cube networks, and low-dimensional torus networks, of say two or three dimensions, are known as good network topologies for achieving a low level of latency and high throughput.

Figure 1A:
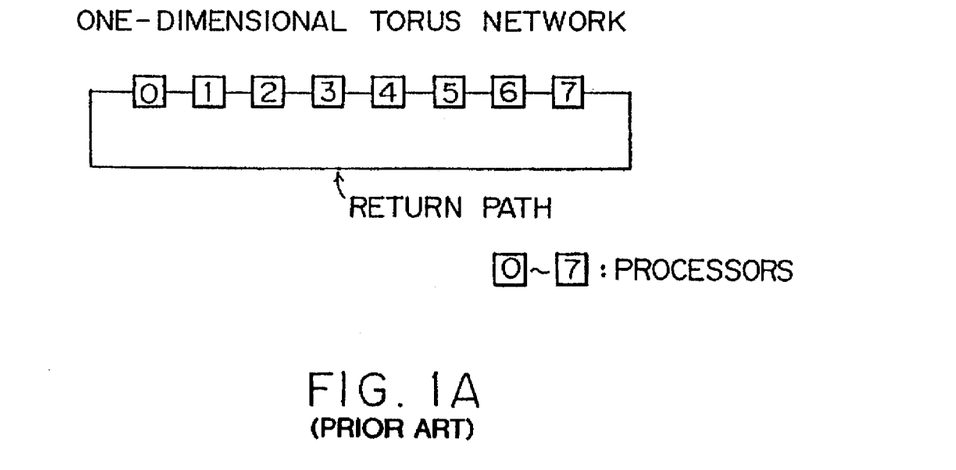
FIGS. 1A and 1B illustrate prior art methods.
Figure 1B:
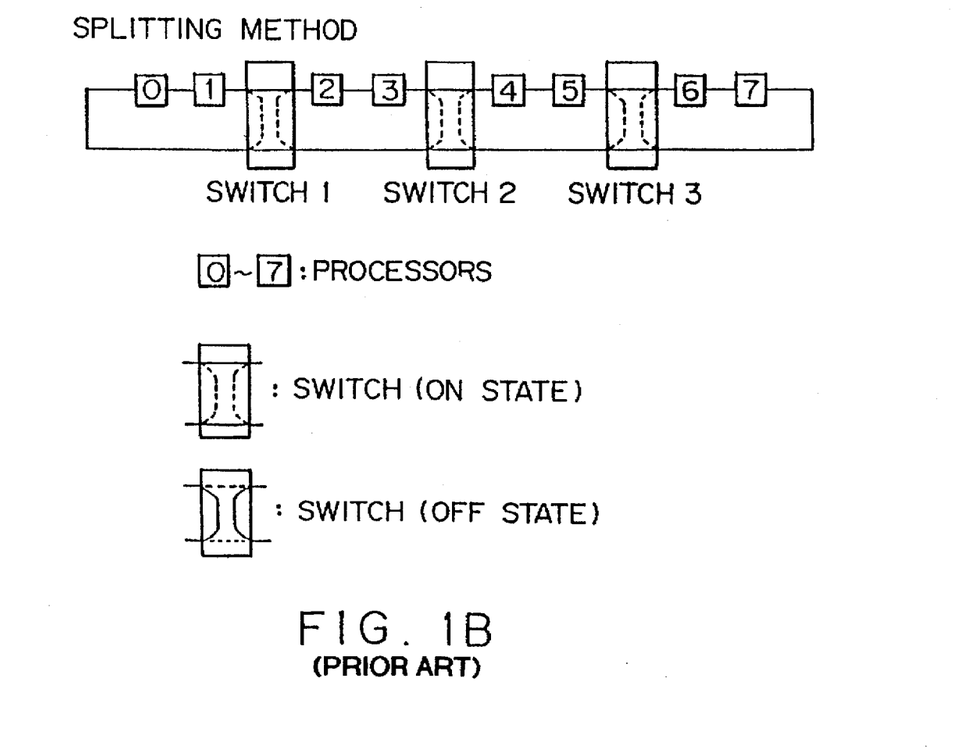

FIGS. 1A and 1B are schematic diagram of a prior art torus network. More particularly, FIG. 1A shows an example of a one-dimensional torus network in which eight nodes are interconnected in a torus network.

A feature of the torus network is that the end processors (processor 0 and processor 7 in FIG. 1A) are connected together. The path connecting the end processors is called a return path. When such a torus network is implemented as hardware, a problem arises in that the wire length of the return path has to become very long because the return path wire wraps around.

In a parallel computer, it is desirable that a number of processors constituting the parallel computer be split into several processor groups for availability to a plurality of users. When a mesh network-based parallel computer is split to make it available as a plurality of systems, processors are reconfigured to form networks of the same phase, thereby allocating one system to each subnetwork.

As a method of splitting a torus network, a recursive torus coupling architecture has been proposed so far (Matsuyama, Aoyama: Recursive Torus Coupling Architecture, The Technical Research Report of the Institute of Electronics Information and Communication Engineers Computer System, CPSY91-4-33, 1991, pp. 49–58).

In this system, a recursive hierarchical structure is embedded in a torus network by placing on/off switches on the network. FIG. 1B is a conceptual diagram illustrating this prior art system in terms of a one-dimensional torus network comprised of eight processors.

In this figure, three switches are placed such that the eight processors can be split into a maximum of four groups called processor element subsets. Each of the switches spans the return path, which links processor 7 and processor 0 together, between two processors (as an example, processor 1 and processor 2). When a switch is in the OFF state, direct connection is established between the corresponding processor and the return path, thereby splitting the network. When the switch is in the ON state, on the other hand, direct connection is made between the two processors and the return path is recovered to thereby restore the original network. For example, when switches 1, 2 and 3 are all placed in the OFF state, the network is split into four sections. When these switches are all placed in the ON state, on the other hand, a single network is restructured.

However, this system will not solve a problem of the torus network that the return path is long.

When an n-dimensional torus network is simply implemented, the return paths connecting the ends of the n-dimensional mesh wrap around. In the case of the above split system, long return paths are left as they are, and switches are inserted in each return path. Each switch is required to be connected with the path between processors as well as a return path (FIG. 1B).

As described above, the prior art split method suffers from problems that long return paths exist and that switches have to be inserted at points on the return paths.

SUMMARY OF THE INVENTION

It is therefore an object of the present invention to provide a torus network, in which the ends of a mesh are connected together, which permits subnetworks of the same phase to be reconfigured with a structure in which long return paths are distributed, which makes a parallel computer available to a plurality of users, and which permits global calculations and broadcast processing to be performed at high speed.

The present invention supposes an n-dimensional torus network-based parallel computer in which processor elements are interconnected in an n-dimensional torus network. Further, the present invention supposes the provision of switches for changing over the network.

The torus network comprises a plurality of processor element subsets, each comprising one or more processor elements. An interleaving connecting unit is provided which interleaves processor-elements and embeds the results of an interleave connection in one n-dimensional layer. Thereby, the processor elements are interconnected by the interleave connection, processor elements at both ends in a usual torus network are placed close to each other and, the length of the return path is distributed throughout the network, thus reducing the length of the return path connecting the processor elements at both ends in a usual torus network.

ON/OFF switch units are placed at interleaving connecting points of the torus network which is interleave-connected by the interleaving connection unit. Each of the switch units are linked to two processor elements and two adjacent switches on the interleaved torus network. That is, each switch unit has four terminals. The two terminals of them are used as input terminals and the two other terminals are used as output terminals.

A switch control unit is provided which changes over the switch units. This switch control unit changes over the switch units so that any one of the input terminals is connected to either of the output terminals. This permits the torus network to be split into processor element subsets or subtorus networks or permits the processor element subsets or the subtorus networks to be integrated into the original torus network.

According to the present invention, the interleave connecting unit permits a long return path inherent in a usual torus network to be eliminated, an irregular delay in communications through the long return path to be decreased and the switch unit permits the split/integration (reconfiguration) of the torus network, By dynamically splitting/integrating the torus network, global calculations and broadcast processing can be increased.

BRIEF DESCRIPTION OF THE DRAWINGS

Other objects and advantages of the present invention will be apparent from the following description of the preferred embodiments of the invention in conjunction with the accompanying drawings in which.

DETAILED DESCRIPTION OF THE PREFERRED EMBODIMENTS

Basic Configuration

Figure 2:
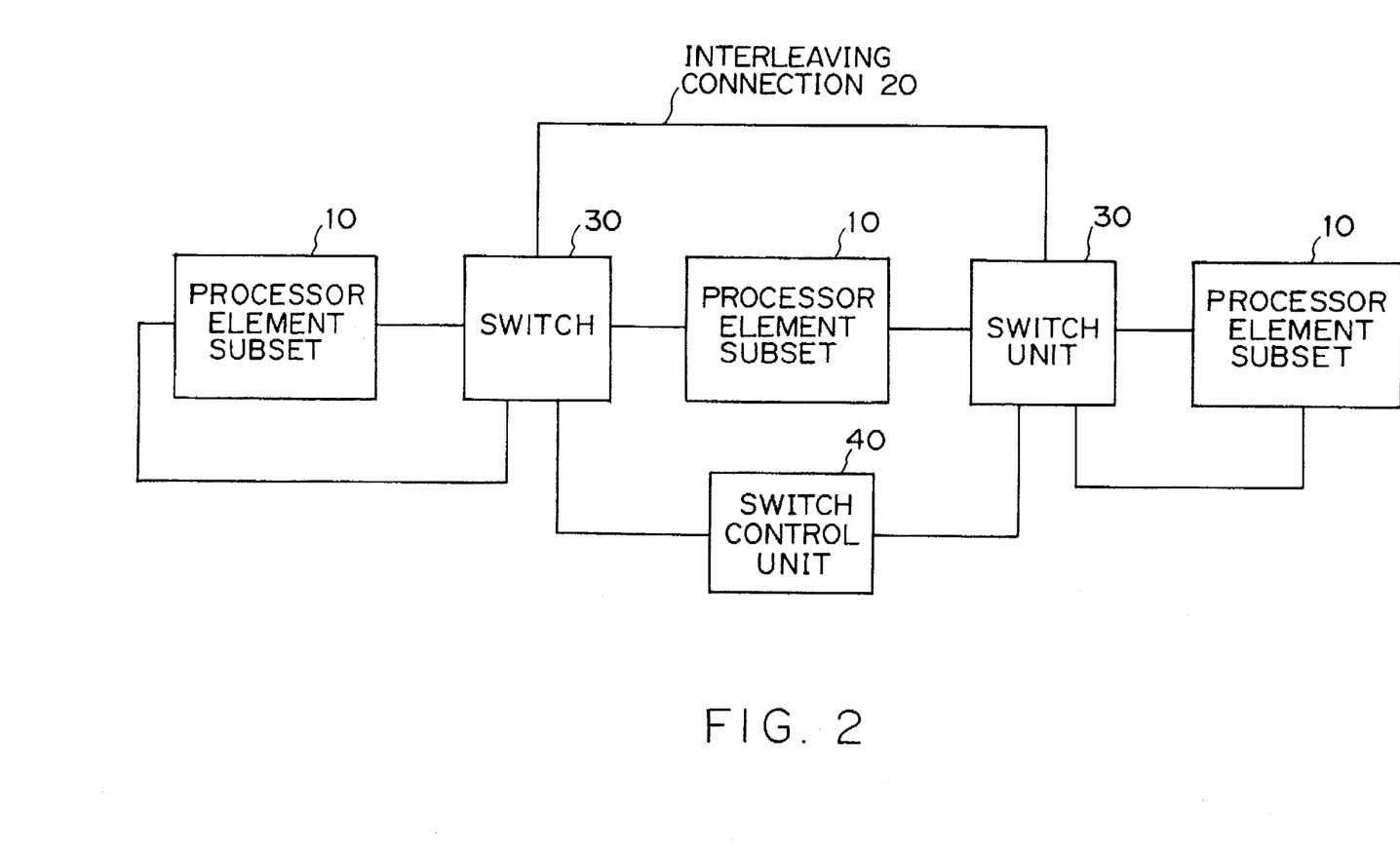
FIG. 2 is a basic block diagram of the present invention.

FIG. 2 is a basic block diagram for explaining the principle of the present invention.

The present invention supposes an n-dimensional-torus-network-based parallel computer. Further, the parallel computer supposes the provision of switches for switching the torus network.

The torus network comprises a plurality of processor element subsets. An interleaving connection unit 20 interleaves processor element subset and embeds the results of the interleave connection in a one dimensional layer for connection. Processor elements are interconnected in an interleaved torus network.

Switch units 30 switch on or off connections at respective interleaving connection points in communication paths of the torus network which is connected by the interleave connection unit 20.

A switch control unit 40 changes over the connections of the switch units 30, as required.

Next, the operation of the functional block diagram shown in FIG. 2 will be described.

FIGS. 3A to 3D illustrate the principle of the present invention. For the purpose of simplifying the description, consider a one-dimensional torus network that is composed of eight processors.

Figure 3A:
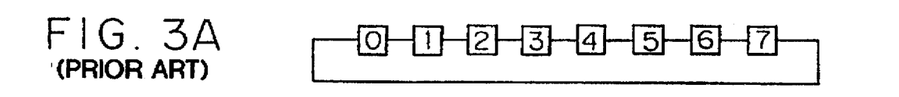
FIGS. 3A, 3B, 3C, and 3D are diagrams for use in explanation of the principle of the present invention.

For comparison there is illustrated a conventional torus network in FIG. 3A. The eight processors numbered 0 through 7 are connected in cascade, and the processors numbered 0 and 7 are linked together by a return path, whereby a doughnut-like torus network is formed.

Figure 3B:
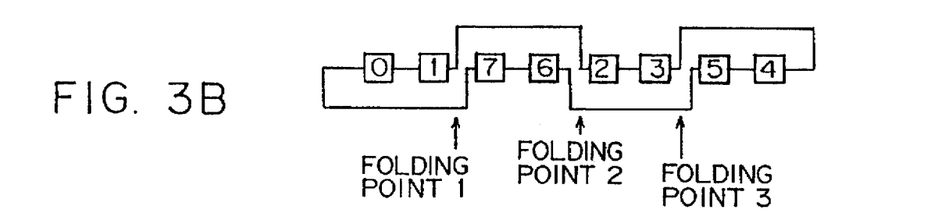
Figure 3C:
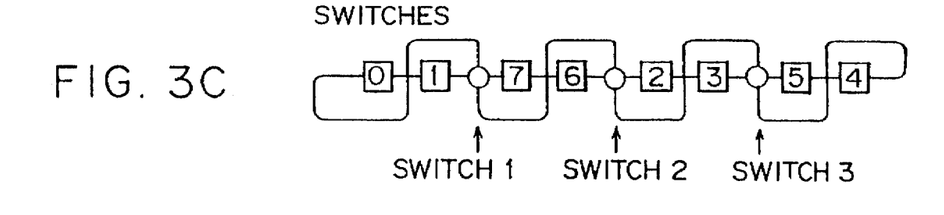

The conventional torus network shown in FIG. 3A is formed into an interleaving or splittable network configuration by the interleave connecting unit 20 and the switch unit 30 as shown in FIGS. 3B and 3C.

That is to say, the conventional torus network of FIG. 3A is interleaved by the interleaving connection unit 20 (see FIG. 3B). In this case, the network is interleaved such that the processors are handled in pairs or sets in order to make the smallest interleave or split configuration of a processor element subset comprise two processors. The interleaving connection starts or ends at folding points 1, 2 or 3. It should be noted here that the minimum interleaving or split configuration need not be restricted to two processors.

Switch units 30 which are indicated by switches 1, 2, and 3, are inserted into the folding points 1, 2, and 3 as shown in FIG. 3C. In this exemplary system in which the minimum processor configuration of each processor element subset or subtorus comprises two processors, switches 1, 2, and 3 are respectively placed between processors 1 and 7, between processors 6 and 2, and between processors 3 and 5. If the smallest processor configuration of each processor element subset or subtorus comprises four processors, then the interleaving connection will start or end at one point, in which case a switch is placed only in the position of switch 2 shown in FIG. 3C.

Figure 3D:
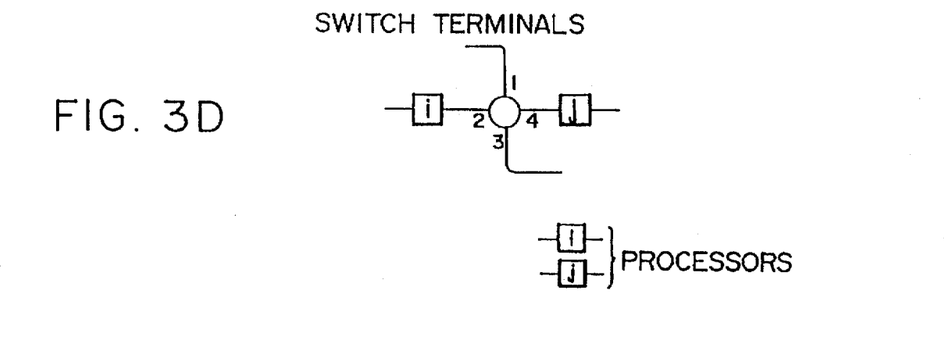

The switch control unit 40 changes over the switch units 30 i.e. switches 1, 2, and 3, in the interleaving or splittable torus network thus formed. As shown in FIG. 3D, each switch unit 30 has four terminals 1, 2, 3, and 4 which are respectively connected to two processors and two adjoining switch units. When, in FIG. 3C, switches 1, 2 and 3 are changed over so that connections are made between terminal 1 and terminal 2 and between terminal 3 and terminal 4, the torus network composed of eight processors can be split into four processor element subsets. The switch unit 30 may be composed of a known crossbar switch or butterfly switch.

When switches 1 and 3 are changed over so that connections are made between terminal 1 and terminal 4 and between terminal 2 and terminal 3, and switch 2 is changed over so that connections are made between terminal 1 and terminal 2 and between terminal 3 and terminal 4, the torus network comprised of eight processors can be split into two processor element subsets. Therefore, as is clear from FIG. 3C, the long return push is eliminated from the torus network.

The changing over of the switches may be performed at regular time intervals by the switch control unit 40, provided in the system management side of the parallel computer. This is a static mode in which the configuration of the subtori is changed on a time-sharing basis to thereby allow several users to use the subtori on a time-sharing basis. The changing over of the switches may also be performed dynamically by the use of messages issued by users in a dynamic mode.

For communications between subtori, a path connecting switches can be used, which permits faster communications than the conventional torus network (i.e., an express torus can be implemented). By this express torus, global calculations and broadcast processing, which are performed frequently in a parallel computer, can be performed at high speed.

Description of the Preferred Embodiments

Hereinafter, the preferred embodiments of the present invention will be described in conjunction with the drawings.

The torus-network splitting method of the present invention can be applied to multi-dimensional torus networks as well as one-dimensional torus networks. Also, the present invention can be applied not only to square networks but also to rectangular networks.

Here, the splitting of a one-dimensional torus network will be described first, and an extension of the splitting method to a two-dimensional network will be described next.

Figure 4A:
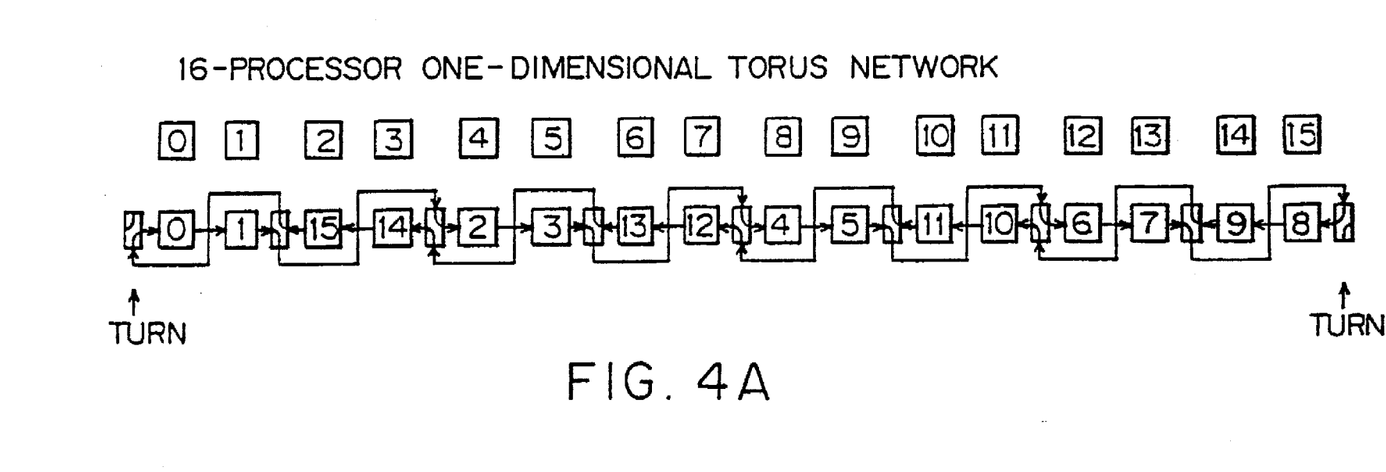
FIGS. 4A and 4B illustrate system configurations of a preferred embodiment of the present invention.
Figure 4B:
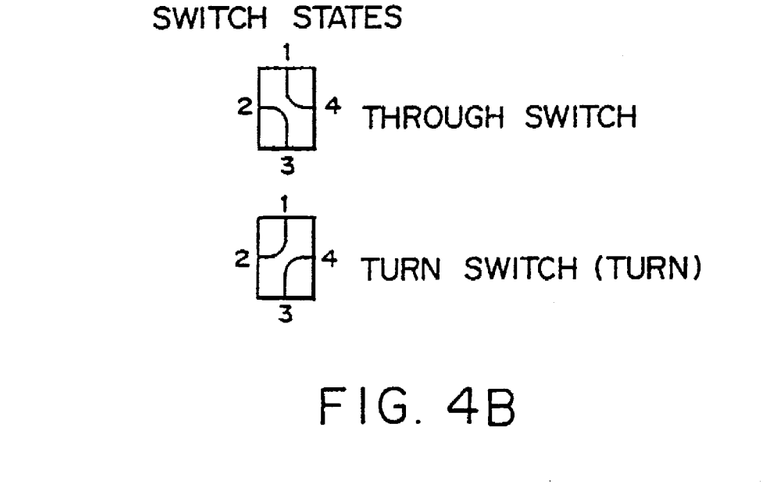

FIGS. 4A and 4B illustrate system configurations of a one-dimensional torus network.

In this example, 16 processors numbered 0 through 15 are interconnected in a one-dimensional torus network. The network is interleaved such that the smallest unit of split, i.e. the smallest processor element subset, comprises two processors. In the figure, the upper numbers represent physical processor identification (ID) numbers, while the numbers within the network represent logical processor identification numbers. By interleaving the network, the processors are logically sequenced such that the following arrangement is produced 0-1-15-14-2-3-13-12-4-5-11-10-6-7-9-8. By interleave-connecting these processors and placing switches as shown in FIG. 4A, a long return path of the torus network is avoided and a reconfigurable torus network is formed.

Since the smallest reconfiguration unit comprises two processors, a switch is inserted every two processors. Each switch has two possible states in order to reconfigure the torus network. FIG. 4B shows the two possible states of the switch (THROUGH state and TURN state). The numbers (1 to 4) in the switch symbols indicate input and output terminals of the switch. The THROUGH state is the switch state that permits the processor element subset to be interleaved and also permits the subtori to be locally integrated into the original torus network. The TURN state is the switch state that permits the torus network to be split logically into subtori.

In FIG. 4A, the switches embedded every two processors are all set to the THROUGH state. For example, the THROUGH switch between processor 3 and processor 13 (represented by logical processor ID here) has its terminal 2 connected to processor 3, its terminal 4 connected to processor 13, its terminal 1 to the next THROUGH switch on the left side, and its terminal 3 connected to the THROUGH switch on the right side, thus linking two subtori respectively comprising processors 2, 3 and processors 13, 12.

TURN switches are placed at the opposite ends of the network. The left TURN switch connects terminal 1 of the next THROUGH switch on the right side and processor 0 together, thus terminating the left end of the torus network. Similarly, the right TURN switch connects terminal 3 of the next THROUGH switch on the left side and processor 8 together, thus terminating the right end of the torus network.

As can be seen from the foregoing, by changing over each switch placed (between processors between the two states of THROUGH and TURN), subtori can be combined into a torus network or a torus network can be split into subtori, thereby permitting the restructure of the torus network.

Figure 5A:
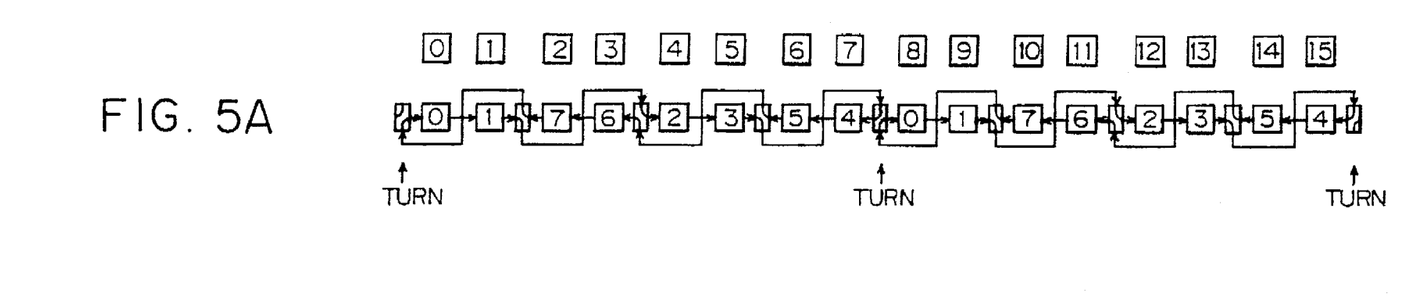
FIGS. 5A, 5B, and 5C illustrate examples of ways in which a torus network is split.
Figure 5B:
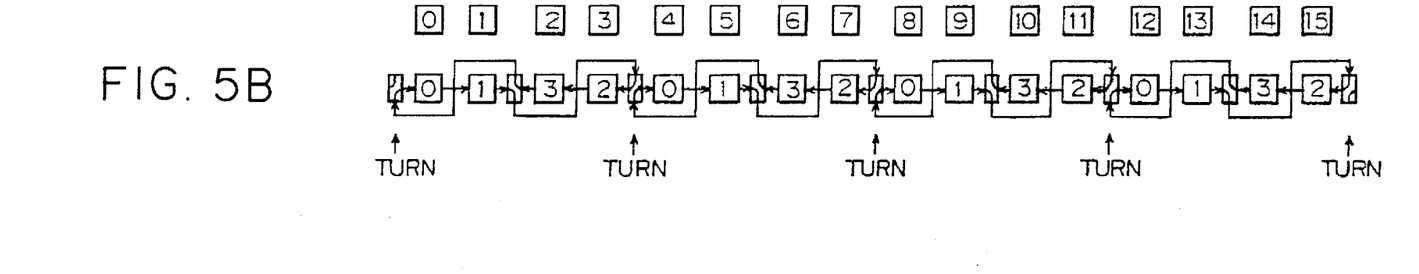
Figure 5C:
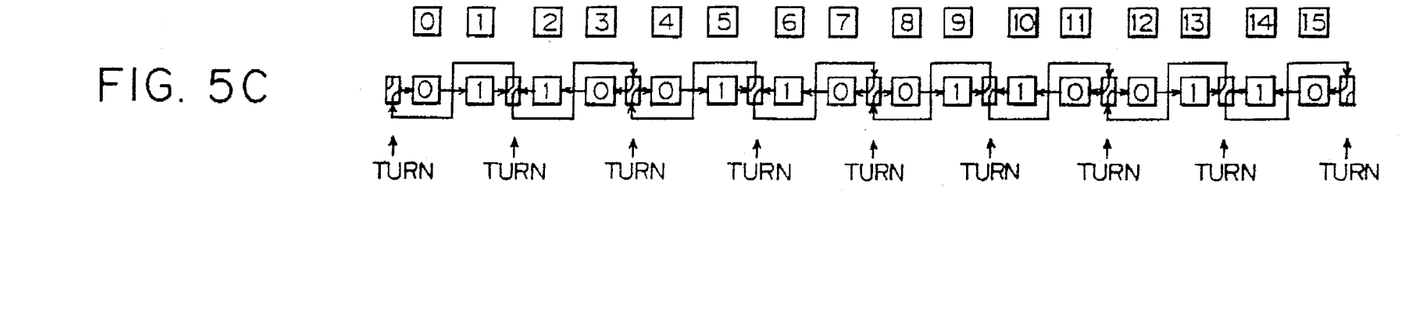

FIGS. 5A to 5C illustrate examples of reconfiguration of the one-dimensional 16-processor torus network of FIG. 4A which are obtained by changing over the switches.

In FIG. 5A, only the switch placed between processor 7 and processor 8 (hereinafter represented by physical processor IDs) is changed over to the TURN state. As a consequence, the 16-processor torus network is split into two 8-processor subtori. If, in this state, the switch between processor 7 and processor 8 is changed over to the THROUGH state, then the torus network will be reconfigured into the one-dimensional 16-processor torus network.

Similarly, when the respective switches between processor 3 and processor 4, between processor 7 and processor 8 and between processor 11 and processor 12 are changed over to the TURN switch state, the torus network is split into four 4-processor subtori as shown in FIG. 5B.

Further, if all the switches of the reconfigurable torus network are changed over to the TURN switch state, then the torus network will be split into eight 2-processor subtori as shown in FIG. 5C.

As described above, by interleave-connecting a processor element subset through the THROUGH state of the switch, the long return push of the torus network is eliminated and by changing over the switches between the TURN state and the THROUGH state, the torus network can be split into some subtorus network or some subtorus network can be combined into one torus network.

Figure 6:
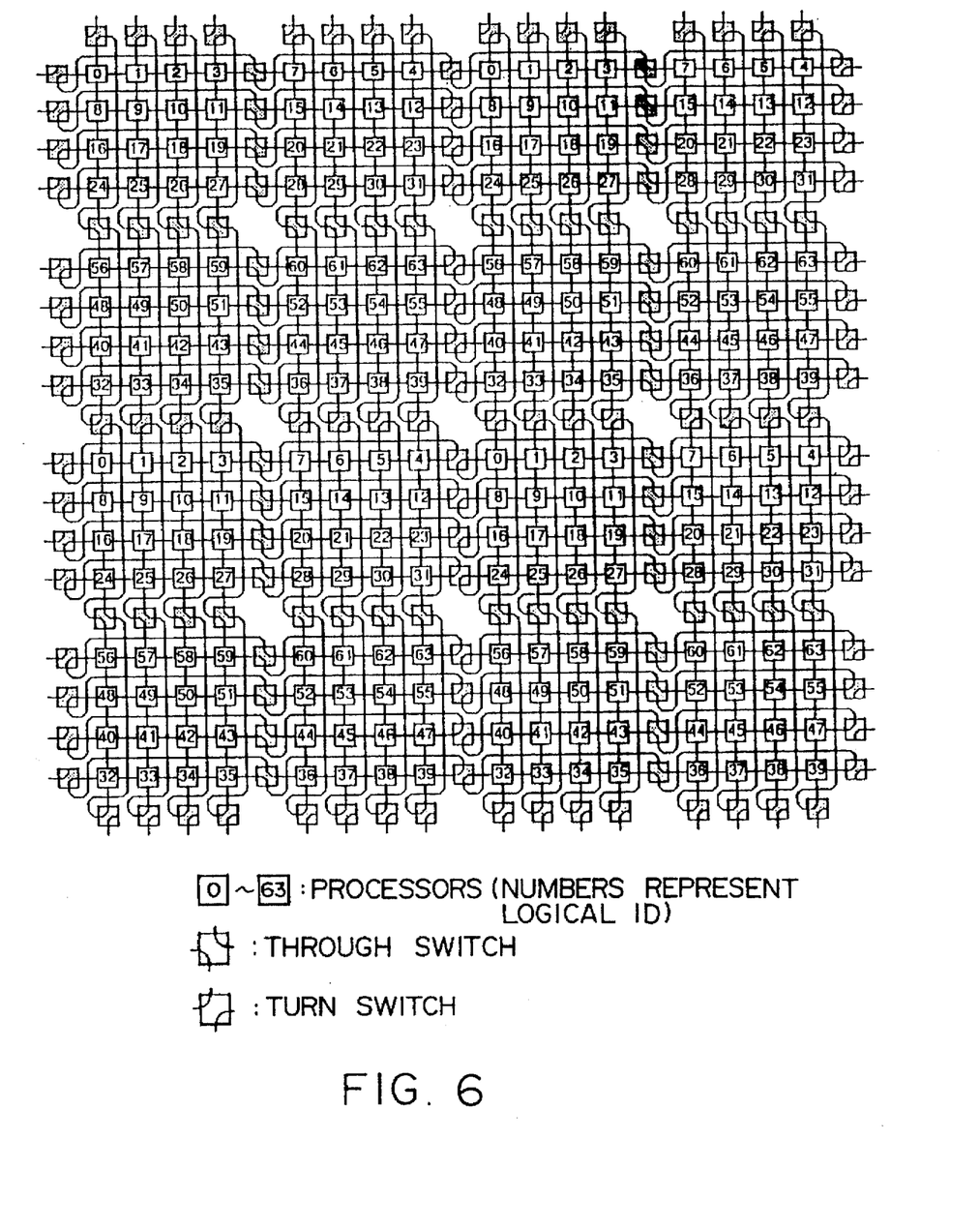
FIG. 6 illustrates a two-dimensional network split into four 8×8 subunits)
Figure 7:
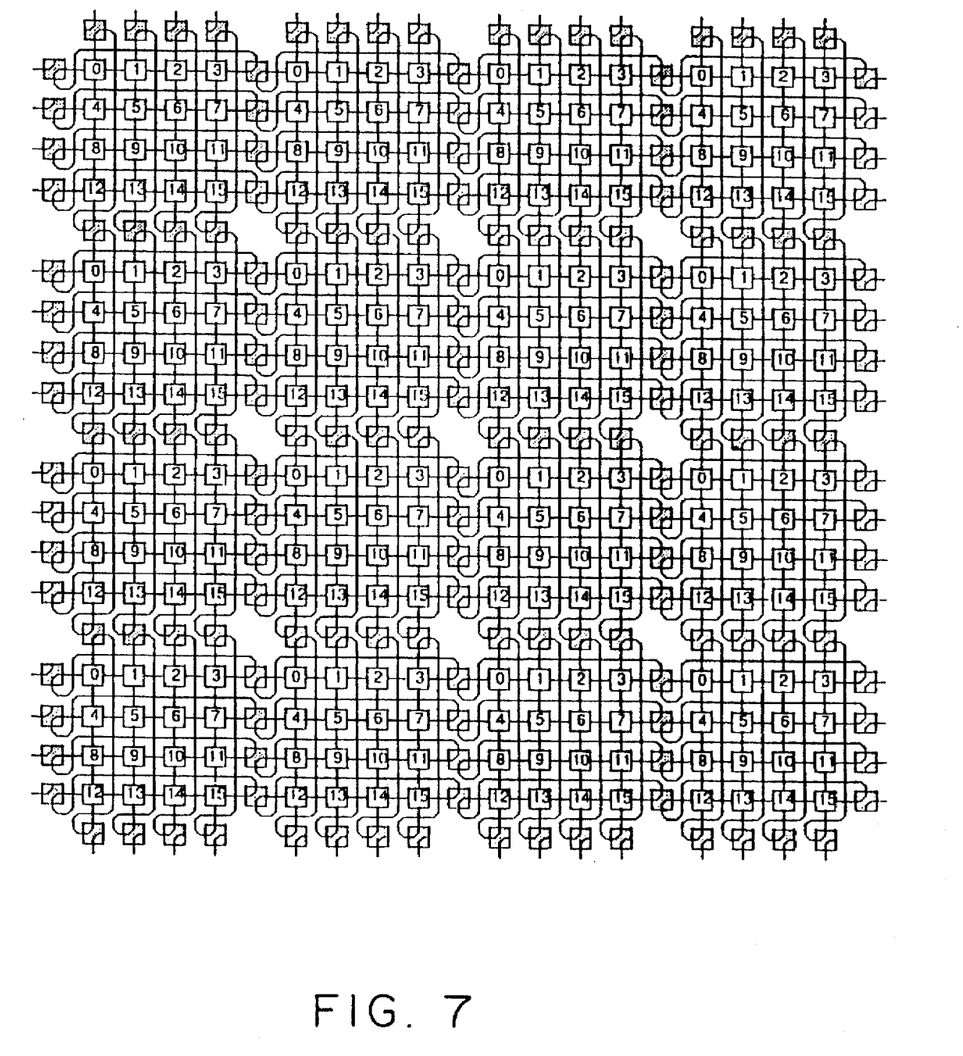
FIG. 7 illustrates a two-dimensional reconfigurable torus network (a reconfigurable torus network split into sixteen 4×4 subunits)

FIGS. 6 and 7 illustrate embodiments of two-dimensional reconfigurable torus networks, both of which comprise 16×16 processors.

In FIG. 6, the smallest split unit comprises 4×4 processors and switches are placed around them. In this case, the switch states are determined such that the network is split into four 8×8 subtori (the processor logical ID numbers in each subtorus are 0 through 63). That is to say, the switches inside each subtorus are set to the THROUGH state, while the switches around the subtorus, i.e., the switches between adjacent subtori are set to the TURN state.

In the network of FIG. 7, as in the network of FIG. 6, the smallest split unit comprises 4×4 processors. In this network, the switch states are determined such that the network is split into sixteen 4×4 processor subtorus (the processor logical ID numbers in each subtorus are 0 through 15). That is to say, all the switches in the network are placed in the TURN state.

Next, a method of determining the switch states explained so far, i.e., a method of restructuring a reconfigurable network will be described.

A reconfigurable torus network can be restructured by the two following methods: a pseudo-static mode and a dynamic mode.

In the pseudo-static mode, the system side, for example, a system manager controls the state of each switch. This mode is a simple yet adequate method to realize the multi-user environment of a parallel computer.

The time is broken into time blocks of, say, several milliseconds, and the switch state is changed every time block to change the configuration of the subtori. Each of the time blocks is allocated to a separate user, thereby realizing the multi-user environment. For example, in a distributed-memory parallel computer (DMPP) with 64×64 processors, a user is allowed to use the whole DMPP as the 64×64 torus at a certain phase, and four different users are allowed to use each of four 16×16 subtori at an another phase.

In the pseudo-static mode described above, the system simply sets the state of each switch to the TURN or THROUGH state prior to each phase. Within one phase, i.e. within a certain time period, the switches are each placed in the fixed state. The routes via the switches in the processor-to-processor communications paths are fixed within that phase.

In the dynamic mode, on the other hand, the state of each switch is changed by a message communicated by a user among processors to reconfigure the torus network. Upon receipt of that message each switch analyzes the contents of the message and then changes its state accordingly, thereby restructuring the torus network.

Figure 8A:
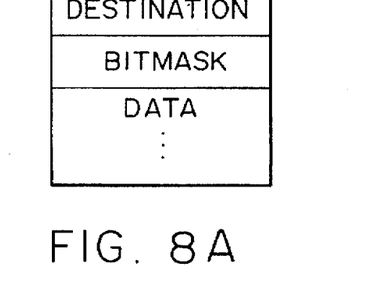
FIGS. 8A, 8B, and 8C are diagram for use in explanation of a switch control system in a dynamic mode.
Figure 8B:
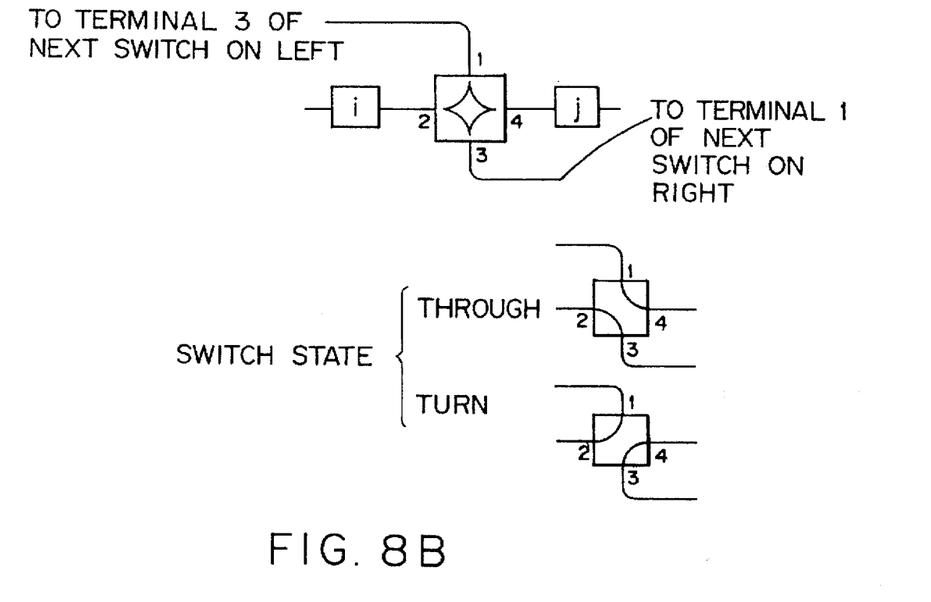
Figure 8C:
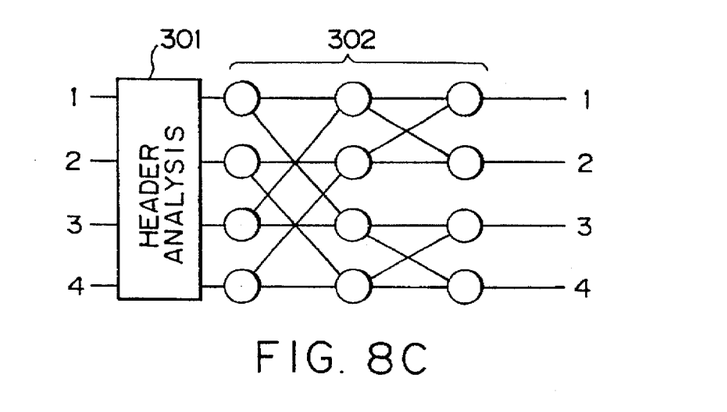

FIGS. 8A to 8C illustrate the switch controlling method in the dynamic mode.

FIG. 8A shows the structure of a message transmitted by a user, which consists of a header part and a data part. The header part comprises a physical processor ID (Destination) indicating the destination of the message and numeric data (Bitmask) representing the subtorus's size. The numeric data Bitmask has numeric values corresponding in number to the dimension of the subtorus. For example, assume that a one-dimensional subtorus has m processors. Then, its Bitmask value b will be b=m−1. In the case of an n-dimensional subtorus, n Bitmask values bk (k=1, 2, n) are provided. With a two-dimensional subtorus having 4×4 processors, Bitmask values b1 and b2 are b1=3 and b2=6.

Upon receipt of a message of FIG. 8A transmitted by a user, a switch analyzes the header information and then determines which of the TURN state and the THROUGH state it is to be set to.

FIG. 8B illustrates the symbol of a switch. The switch is interposed between processor i and processor j. Processor i is connected to terminal 2 of the switch, while processor j is connected to terminal 4 of the switch. Switch terminal 1 is connected to terminal 3 of the next switch on the left side, while switch terminal 3 is connected to terminal 1 of the next switch on the right side.

When the switch is to be set to the THROUGH state as a result of the analysis of the header information, connections are made between terminal 1 and terminal 4 and between terminal 2 and terminal 3. When the switch is to be set to the TURN state, on the other hand, connections are made between terminal 1 and terminal 2 and between terminal 3 and terminal 4.

FIG. 8C shows an embodiment of the switch. The switch can be implemented by a header analyzing section 301 and a butterfly network 302, for example. When the result of analysis by the header analyzing section 301 indicates THROUGH, the butterfly network 302 is controlled so that inputs 1, 2, 3, 4 are coupled to outputs 4, 3, 2, 1, respectively. If, on the other hand, the result of analysis made by the header analyzing section 301 indicates TURN, then the butterfly network 302 is controlled so that inputs 1, 2, 3, 4 are coupled to outputs 2, 1, 4, 3, respectively.

Figure 9A:
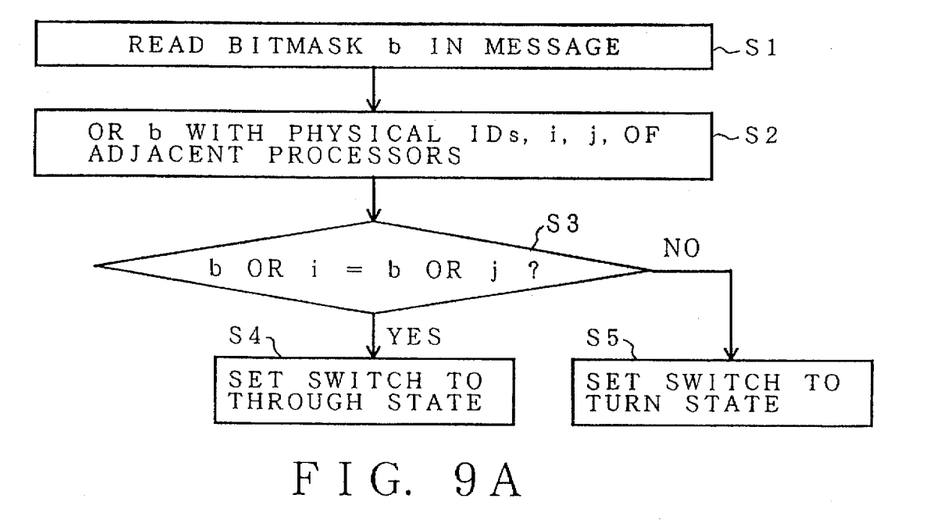
FIGS. 9A and 9B are flowcharts illustrating the operation of a header analyzing unit in the dynamic mode.
Figure 9B:
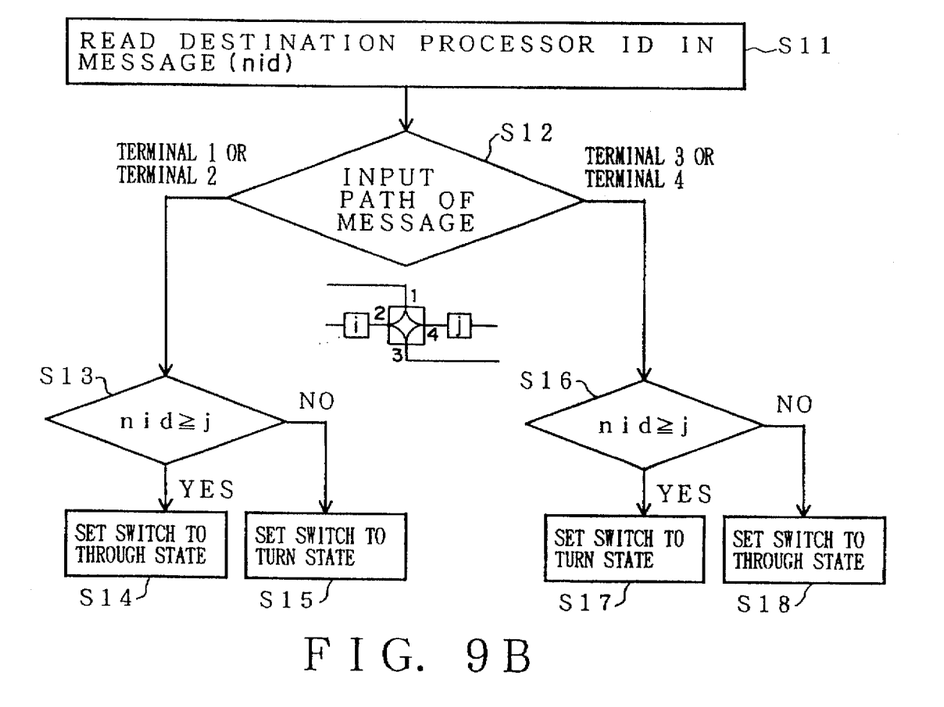

FIGS. 9A and 9B are flowcharts illustrating the operation of the header analyzing section.

The flowchart of FIG. 9A is directed to a method of controlling the switch using Bitmask values in the header of a message.

When a message transmitted by a user arrives at the switch, the header analyzing section 301 reads a Bitmask value b in the header of the message (step S1). The value b is ORed with each of i and j, which represent the physical IDs of the adjacent processors, bit by bit (step S2). If, for example, the size of a one-dimensional subtorus is eight processors, and the physical IDs of the adjacent processors are 3 and 4, then b=7 ("0111" in binary), i=3 ("0011" in binary), and j=4 ("0100" in binary). Hence b OR i=7 ("0111" in binary) and b OR j=7 ("0111" in binary). If, for example, the size of a one-dimensional subtorus is eight processors, and the physical IDs of the adjacent processors are 7 and 8, then b=7 ("0111" in binary), i=7 ("0111" in binary), and j=8 ("1111" in binary). Hence b OR i=7 ("0111" in binary) and b OR j=8 ("1111" in binary). In this case, an imaginary processor is considered next to the end of the one-dimensional subtorus and the physical ID of the imaginary processor is j which is equal to i+1, i.e. 8.

Next, a decision is made as to whether or not the b OR i value and the b OR j value are equal to each other (step S3). If they are equal (YES), then the switch is set to the THROUGH state (step S4). On the other hand, if they are not equal (NO), then the switch is set to the TURN state (step S5).

According to this control method, the user is allowed to restructure the subtorus by specifying the Bitmask value. For example, in the case of the one-dimensional torus network of FIG. 4A in which 16 processors are included and the smallest subtorus configuration comprises two processors, if the user sets the Bitmask value b to b=7, then the results will be (b OR i)≠(b OR j) for the switch between processor 7 and processor 8 and (b OR i)=(b OR j) for other switches.

As a result, the switch between processor 7 and processor 8 is set to the TURN state, while the other switches are set to the THROUGH state.

If the user sets so that Bitmask value b=3, then the results will be (b OR i)≠(b OR j) for the switches between processor 3 and processor 4, between processor 7 and processor 8, and between processor 11 and processor 12 and (b OR i)=(b OR j) for other switches.

As a result, the switches are controlled so that the switches between processor 3 and processor 4, between processor 7 and processor 8, and between processor 11 and processor 12 are set to the TURN state, and the other switches are set to the THROUGH state.

FIG. 9B is a flowchart illustrating the operation of a control method using a Destination value in the header of a message.

When a message transmitted by a user arrives at a switch, the header analyzing section reads a Destination value n id in the header of the message (step S11). The n id represents the physical ID of a destination processor.

Next, a decision regarding the message input path is made (step S12). The subsequent processing varies according to the input path of that message. When the message is routed via terminal 1 or terminal 2 (processor i) of the switch, a comparison is then made between the n id value and the processor physical ID j (S13). If n id≧j (YES), then that switch is controlled so that it is set to the THROUGH state (S14). Conversely, if n id<j (NO), then that switch is controlled so that it is set to the TURN state (step S15).

When the message is routed via terminal 3 or terminal 4 (processor j) of the switch, on the other hand, a comparison is made likewise between the n id value and the processor ID value j (step S16). If n id≧j (YES), then that switch is controlled so that it is set to the TURN state (S17). Conversely, if n id<j (NO), then that switch is controlled so that it is set to the THROUGH state (step S18).

As described above, by controlling switches using a destination processor ID (n id) contained in a message, the state of each of the switches placed between a processor from which that message is transmitted by a user and the destination processor can be changed over.

Next, a method of performing global calculations and broadcast processing at high speed by using a control method that is an extension to the dynamic mode switch control method for the global calculations and the broadcast processing.

Referring back to the network of FIG. 6 in which 16×16=256 processors are divided into four subunits by switches, processor 0 and processor 7, in the 8×8 subunit at the upper left, are linked together via a turn switch connected to processor 0 and a through switch connected to processor 7 with a distance of 1 therebetween. Here, the distance between adjacent processors is assumed to be 1. In the routing of a normal torus network, the distance between processor 0 and processor 7 is 4 because processors 1, 2 and 3 are interposed therebetween. It will therefore be appreciated that a route via the above-recited turn and through switches is a shortcut.

Communication delays include delays caused by wires linking processors and delays originating in processors. The processor delays usually are considerably larger than the wire delays. If, therefore, use is made of a communications path that is provided with a smaller number of nodes in the middle, then it will be possible to decrease delays. In the present system, any path via switches is linked to a remote processor without passing through intermediate processors, which permits a message to be routed at high speed to any remote processor. Such a path is here called an express torus.

The use of this express torus permits global calculations and broadcast processing, which usually require a large amount of time for communications because of long distance, to be completed in a short period.

The global calculations, which obtain the sum of values of certain variables, maximum values, minimum values, etc. in all processors, are a commonly used calculation pattern in a parallel computer.

The basic algorithm of global calculations using an express torus is hierarchical.

Figure 10:
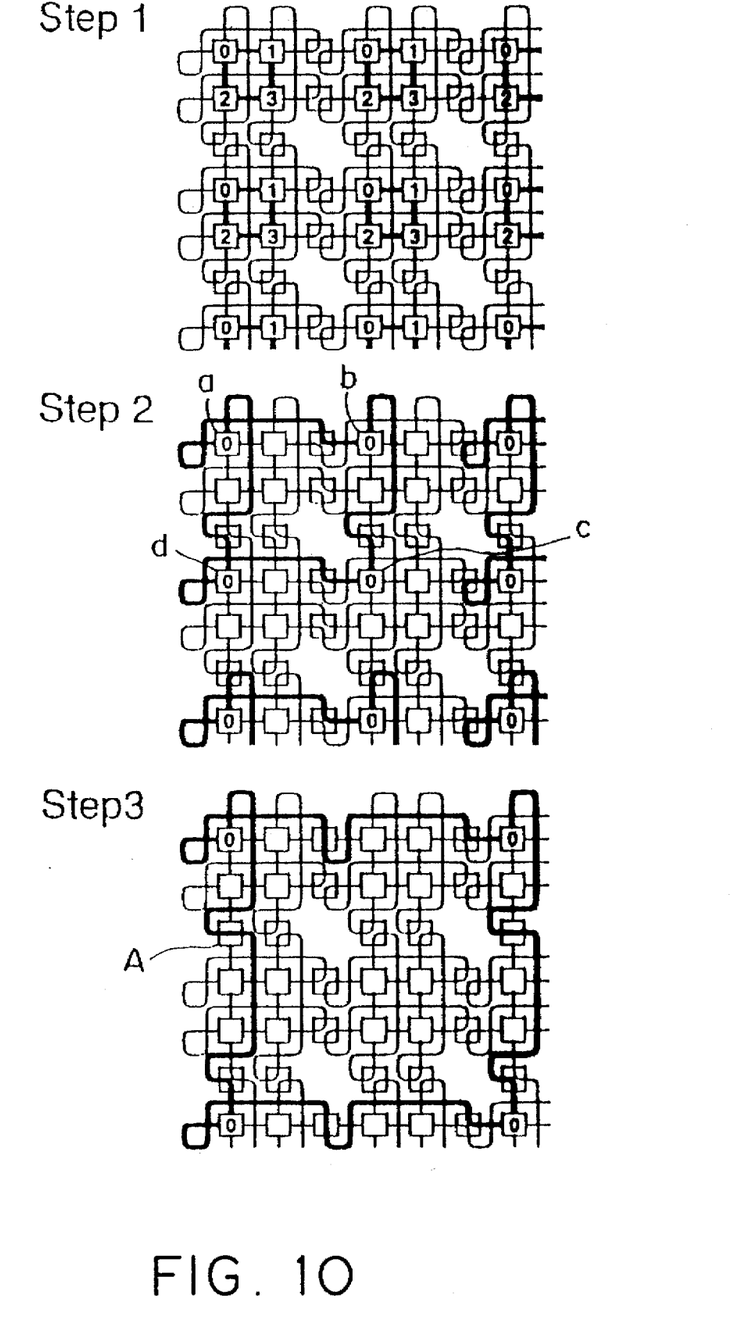
FIG. 10 is a diagram for use in explanation of global calculations.

FIG. 10 is a diagram explanatory of global calculations using an express torus.

A reconfigurable torus network in the figure is of two-dimensions the smallest unit of which comprises 2×2 processors. Although 5×5 processors are shown in the figure, they form only a part of that torus network. In fact, such network parts are extended.

First, global calculations are performed by the smallest unit of network split comprised of 2×2 processors, and a representative processor among them. For example, processor 0, waits for the results of calculations (Step 1). Next, the representative processors in the four units (processors 0 in the four units, indicated at a, b, c, d in Step 2) interchange the results of global calculations and then perform further global calculations, the results of which are held by a representative processor (for example, processor a) (Step 2). At this point, data interchange among the processors is performed through the express torus via switches. As can be seen from the figure, each of the processors a, b, c and d is adjacent to another with a switch interposed therebetween.

As the above processing is repeated, the unit area where the global calculations are performed extends gradually to a larger subunit (5×5 processors in Step 3). Finally, when the results of the whole global calculations are obtained, the results are sent from an upper hierarchical level to a lower hierarchical level, i.e., in the direction opposite to that of the calculations. This permits all the processors to hold the results of the whole global calculations.

Like the global calculations, the broadcast processing can also be performed using an express torus. That is, a broadcast request is first issued to a processor at the highest level in the hierarchy. Then, data is sent from an upper hierarchical level to a lower hierarchical level in sequence. This permits the data to be sent to all of the processors.

In order to use an express torus for global calculations and broadcast processing, it is necessary to extend the switch control system in the dynamic mode. That is, although the switch state in the dynamic mode is restricted to the THROUGH and TURN states, it is required that, in the express torus, any two of the four terminals of each switch be capable of being linked together. In the switch indicated at A in the Step 3 of FIG. 10, terminal 1 and terminal 3 are shown linked together. An express torus cannot be implemented without being capable of linking any two of the switch terminals together in such a manner. Explaining the extended switch control system in terms of the embodiment of the switch shown in FIG. 8C, the switch is controlled so that input terminal 1, for example, can be linked to any one of output terminals 2, 3 and 4.

Figure 11:
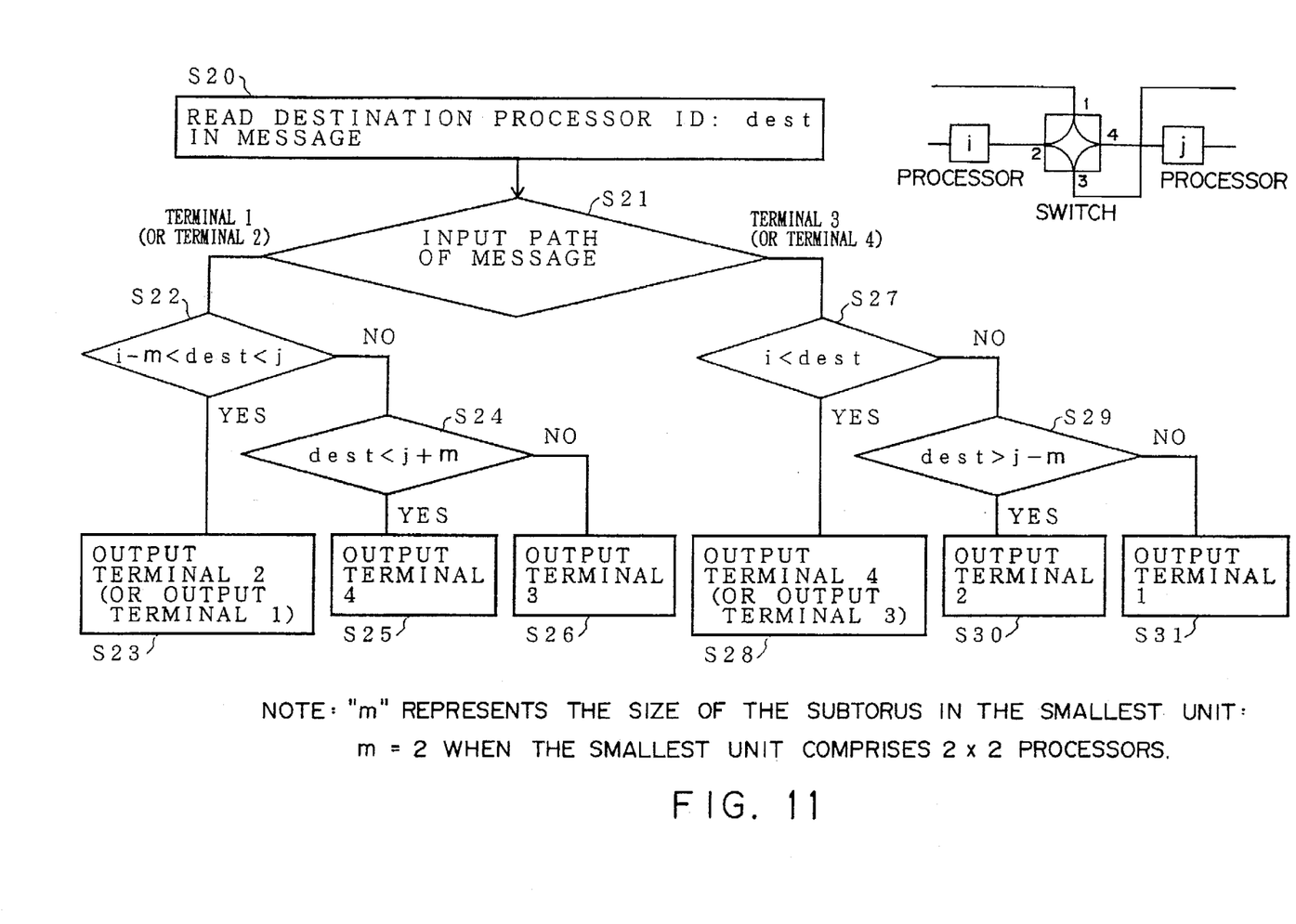
FIG. 11 is a flowchart illustrating the operation of the header analyzing unit in an express torus.

FIG. 11 is a flowchart for the header analyzing operation in an express torus in the network shown in FIG. 10.

When a message transmitted from a processor arrives at a switch, information on the destination of that message (physical processor ID:dest) in the header part is read first (step S20).

Next, a message input path decision is made (step S21). The subsequent processing varies according to the input path of the message. When the message is routed via terminal 1 or terminal 2 (processor i), a comparison is made among the destination processor ID (dest), i−m (m represents the size of the smallest subunit: m=2 when the smallest subunit comprises 2×2 processors), and j (step S22). That is, a decision is made as to whether or not the destination processor is in a smallest subunit at the left of the switch. When i−m<dest<j (YES, i.e., the destination processor is in a smallest subunit at the left of the switch), the switch is controlled so as to link terminal 1 and terminal 2 together (step S23).

When not i−m<dest<j (NO), a comparison is then made between dest and j+m (step S24). That is, a decision is made as to whether or not the destination processor is in a smallest subunit at the right of the switch. When dest<j+m (YES, i.e., the destination processor is in a smallest subunit at the right of the switch), the terminal via which the message is routed is linked to terminal 4 (step S25). When dest≧j+m (NO), on the other hand, that terminal is linked to terminal 3 (step S26).

When the message is routed via terminal 3 or terminal 4, on the other hand, a comparison is made between dest and i (step S27). That is, a decision is made as to whether or not the destination processor is to the right of the switch. When i<dest (YES, i.e., the destination processor is to the right of the switch), terminal 3 and terminal 4 are linked together (step S28). When i≧dest (NO, i.e., the destination processor is to the left of the switch), on the other hand, a comparison is then made between dest and j−n (step S29). This makes a decision of whether or not the destination processor is in the subunit immediately to the left of the switch. If dest>j−m (YES, i.e., the destination processor is in the subunit immediately to the left of the switch), then terminal 2 is made the output terminal (step S30). If dest≦j−m (NO), then terminal 1 is made the output terminal (step S31).

The above-described header analyzing method permits a message to be sent to any destination processor over the shortest route.

The use of such message transmission-based switching as described above permits high-speed communications among processor elements in a parallel computer. This could also be utilized to establish synchronization of all or part of processors in a parallel computer.

In the event of the occurrence of a failure in part of the processor elements in a parallel computer, it would also be possible to change over switches so as to isolate a subtorus containing a failed processor element, continue processing by the use of other subtori, and repair or replace the failed processor element in the isolated subtorus.

What is claimed is:

1. A reconfigurable torus network system for use in a parallel computer comprising:

first, second and third adjacent processor element subsets, each comprising at least one processor element, and each having respective input and output terminals;

a first switch connected to the input and output terminals of said first processor element subset and connected to the output terminal of said second processor element subset;

a second switch connected to the input and output terminals of said third processor element subset, connected to the input terminal of said second processor element subset, and connected to the first switch; and interleave connection means for setting said first and second switches to electrically connect the output terminal of said first processor element subset to the input terminal of said third processor element subset such that data from said first processor element subset is directly transferred to said third processor element subset and for setting said second switch to electrically connect the output terminal of said third processor element subset to the input terminal of said second processor element subset to thereby transfer data from said first processor element subset to said second processor element subset through said third processor element subset.

2. The reconfigurable torus network system according to claim 1 wherein:

said first switch comprises a THROUGH state in which the output terminal of said first processor element subset is connected to said second switch and a TURN state in which the output terminal of said first processor element subset is connected to the input terminal of said first processor element through a self connecting return path.

3. The reconfigurable torus network system according to claim 1 wherein said interleaving connection means is comprised of communicative path wire.

4. The reconfigurable torus network system according to claim 1, said first and second switches having a corresponding plurality of states wherein said switch control means determines respective states of said first and second switches in response to a system manager control before a user uses said parallel computer and fixes said first and second switches into predetermined states while said user is using said parallel computer, thereby splitting/integrating said torus network statically.

5. The reconfigurable torus network system according to claim 1, wherein said first and second switches are configured as requested by a user, thereby splitting/integrating said torus network dynamically.

6. The reconfigurable torus network system according to claim 1, wherein said first and second switches are configured in response to a message that is created by said user and communicated over the torus network system.

7. The reconfigurable torus network system according to claim 6, said message having a contents, wherein a number of selected processor elements included in said torus network system are specified by said message contents, and said first and second switches corresponding to said selected processor elements are switched in accordance with the contents of said message.

8. The reconfigurable torus network system according to claim 6, wherein an identification number of a selected processor element is specified upon communication, and said first switch is configured in accordance with the contents of said message.

9. The reconfigurable torus network system according to claim 1, further comprising means for permitting high-speed communication among said processor elements to thereby perform high-speed global calculations in all of said processor elements included in said parallel computer.

10. The reconfigurable torus network system according to claim 1, further comprising means for permitting high-speed communication among said processor elements to thereby perform high-speed broadcast processing on all processor elements included in said parallel computer.

11. The reconfigurable torus network system according to claim 1, in which wherein high-speed communication is performed among processor elements and said first switch is configured dynamically to thereby perform high-speed broadcast processing on a portion of the processor elements included in said parallel computer.

12. The reconfigurable torus network system according to claim 1, further comprising means for performing high-speed communication among processor elements and providing synchronization of all processor elements included in said parallel computer at high speed.

13. The reconfigurable torus network system according to claim 1, wherein high-speed communication is performed among processor elements and said first switch is configured dynamically to thereby provide synchronization of a portion of the processor elements included in said parallel computer at high speed.

14. The reconfigurable torus network system according to claim 1, further comprising means for splitting the torus network system to isolate a failed processor element for subsequent replacement.

15. A reconfigurable torus network system for use in a parallel computer comprising:

a system manager outputting first and second control signals;

first, second and third processor element subsets, each comprising at least one processor element, and each comprising respective input and output terminals;

a first switch connected to the input terminal and the output terminal of said first processor element subset, and connected to the output terminal of said second processor element subset;

a second switch connected to said first switch, connected to the input terminal of said second processor element subset, and connected to the input terminal and the output terminal of said third processor element subset; and switch control means for controlling the first and second switches to connect the output terminal of said first processor element subset to the input terminal of said second processor element subset through said first and second switches in response to the first control signal, and for controlling the first switch to connect the output terminal of the first processor element subset to the input terminal of the first processor element subset through the first switch in response to the second control signal.

16. The reconfigurable torus network system according to claim 15, wherein said switch control means configures said first and second switches while said user is using said parallel computer, thereby splitting/integrating said torus network statically.

17. The reconfigurable torus network system according to claim 15, wherein said switch control means configures said first and second switches as requested by a user, thereby splitting/integrating said torus network dynamically.

18. The reconfigurable torus network system according to claim 17, wherein said switch control means configures said first and second switches in response to a message created by said user and communicated over said torus network.

19. The reconfigurable torus network system according to claim 18, said message having contents, wherein said processor elements included in said torus network system are specified by said message contents, and said switch control means configures said first and second switches in accordance with the contents of said message.

20. The reconfigurable torus network system according to claim 18, wherein an identification number of a selected processor element is specified upon communication, and said switch control means configures said first switch in accordance with the contents of said message.

21. A reconfigurable torus network system for a parallel computer comprising:
 first and second processor element subsets, each comprising at least one processor element, and each comprising respective input and output terminals;
 a first switch electrically connected to the input and the output terminals of said first processor element subset, and to the output terminal of said second processor element subset;
 a second switch electrically connected to said first switch and the input terminal of said second processor element subset; and
 a third processor element subset, comprising at least one processor element and respective input and output terminals, wherein the input and output terminals are connected to said second switch;
 wherein data from said first processor element subset is transferred from the output terminal of said first processor element subset to said first switch, to said second switch, to the input terminal of said third processor element subset, to the output terminal of said third processor element subset, to said second switch and then to said second processor element subset.

22. A reconfigurable torus network system comprising:
 first and second subunits, each including a plurality of processor elements and having respective input and output terminals, as a torus network; and
 switch means connected to the input and output terminals of said first subunit and connected to the input and output terminals of said second subunit, wherein said switch means connects the output terminal of said second subunit to the input terminal of said first subunit while connecting an output terminal of said first subunit to the input terminal of said second subunit, and for dividing said first and second subunits by connecting the output terminal of said second subunit to the input terminal of said second subunit and by connecting the output terminal of said first subunit to the input terminal of said first subunit.

23. A reconfigurable N dimensional torus network system including a plurality of one dimensional torus networks for use in a parallel computer, each one dimensional torus network comprising:
 a plurality of processors each having respective input and output terminals;
 a first set of switches disposed between first and second adjacent processors;
 a second set of switches disposed on first and second ends of the torus network; and
 interleave connection means for setting one of said first set of switches to electrically connect an output terminal of said first processor to an input terminal of a third processor which is non-adjacent to said first processor such that data from said first processor element is directly transferred to said third processor, and for setting one of said second set of switches to electrically connect an input terminal of the second processor element to an output of a fourth processor element existing on an end of said torus network through a switch of said first set of switches.

24. A reconfigurable N dimensional torus network system including a plurality of one dimensional torus networks for use in a parallel computer, each one dimensional torus network comprising:
 a plurality of processors each having respective input and output terminals;
 a first set of switches disposed between first and second adjacent processors;
 a second set of switches disposed on first and second ends of the torus network; and
 interleave connection means for setting one of said first set of switches to electrically connect an output terminal of said first processor to an input terminal of a third processor which is non-adjacent to said first processor such that data from said first processor is directly transferred to said third non-adjacent processor and for setting one of said second set of switches to electrically connect an output terminal of the second processor to an input of a fourth processor existing on an end of said torus network through a switch of said first set of switches.

25. A reconfigurable torus network system for use in a parallel computer comprising:
 first, second and third adjacent processor element subsets, each comprising at least one processor element, and having respective input and output terminals;
 a first switch connected to the output terminal of said first processor element subset;
 a second switch connected to the input terminal of said third processor element subset and said first switch; and
 interleave connection means for setting said first and second switches to electrically connect the output terminal of said first processor element subset to the input terminal of said third processor element subset such that data from said first processor element subset is directly transferred to said third processor element subset and for setting said second switches to electrically connect the output terminal of said third processor element subset to the input terminal of said second processor element subset to thereby transfer data from said first processor element subset to said second processor element subset through said third processor element subset.

26. The reconfigurable torus network system according to claim 25 wherein:
 said first switch comprises a THROUGH state in which the output terminal of said first processor element subset is connected to said second switch and a TURN state in which the output terminal of said first processor element subset is connected to the input terminal of said first processor element through a self connecting return path, and
 said first switch operates in the THROUGH state and said second switch operates in a TURN state.

* * * * *

UNITED STATES PATENT AND TRADEMARK OFFICE
CERTIFICATE OF CORRECTION

PATENT NO.  : 5,689,661
DATED       : November 18, 1997
INVENTOR(S) : Kenichi HAYASHI, et al.

It is certified that error appears in the above-indentified patent and that said Letters Patent is hereby corrected as shown below:

Column 1

Line 28, "diagram" should be --diagrams--.

Column 3

Line 15, after "dimensional", insert --reconfigurable torus network (a reconfigurable torus--.

Line 42, "subset" should be --subsets--.

Column 12

Line 10, delete "in which".

Signed and Sealed this

Twenty-fourth Day of February, 1998

Attest:

BRUCE LEHMAN

Attesting Officer

Commissioner of Patents and Trademarks